United States Patent

Oku et al.

[11] Patent Number: 5,141,982
[45] Date of Patent: Aug. 25, 1992

[54] ELECTRO-CONDUCTIVE RESIN COMPOSITION

[75] Inventors: Mitsumasa Oku, Toyono; Motoi Kitano, Kawanishi; Koujiro Mastsuo, Yamatokouriyama; Jyun Yagi, Hirakata; Tadashi Imai, Osaka, all of Japan

[73] Assignee: Matsushita Electric Industrial Co., Ltd., Osaka, Japan

[21] Appl. No.: 678,151

[22] Filed: Apr. 2, 1991

[30] Foreign Application Priority Data

Apr. 4, 1990 [JP] Japan .................................. 2-089939

[51] Int. Cl.⁵ .............................................. C08K 3/22
[52] U.S. Cl. ................................. 524/432; 524/439; 524/440
[58] Field of Search ................................. 524/432, 440

[56] References Cited

U.S. PATENT DOCUMENTS 5,034,447  7/1991  Izumidas et al. .................. 524/432

Primary Examiner—Paul R. Michl
Assistant Examiner—Yong S. Lee
Attorney, Agent, or Firm—Wenderoth, Lind & Ponack

[57] ABSTRACT

The present invention relates to an electrically conductive resin composition used as sheilding materials against electromagnetic radiation and antistatic or static dissipative materials, having a stable electro-conductivity.

Therefore, the resin composition according to the invention comprises a matrix resin blended with metal fibers and zinc whiskers in a tetrapod shape as shown in FIG. 1.

14 Claims, 3 Drawing Sheets

FIG. I
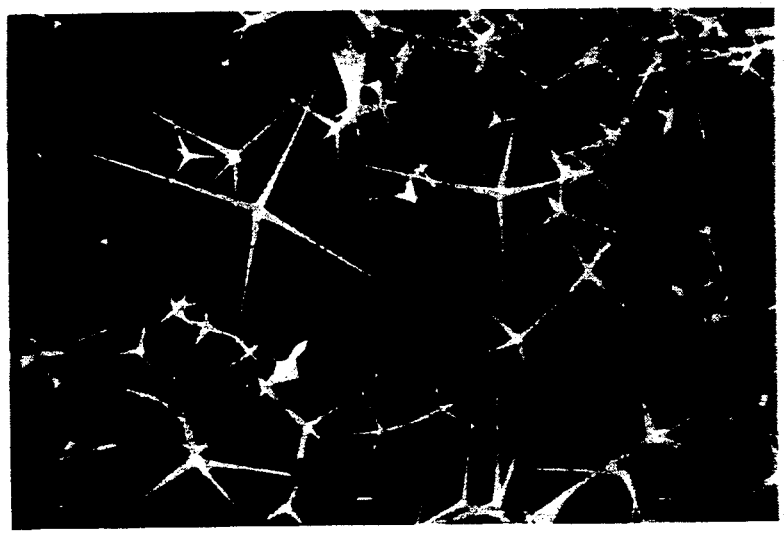
100μm

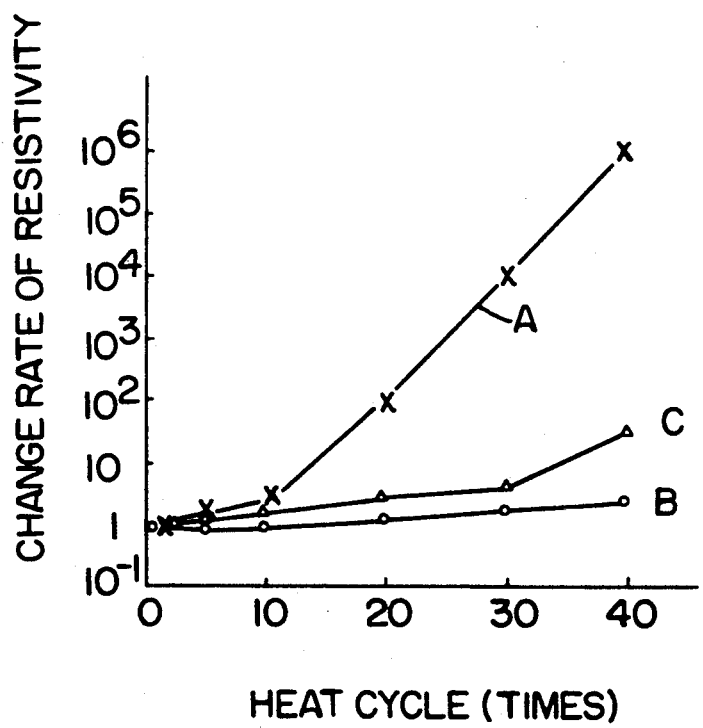

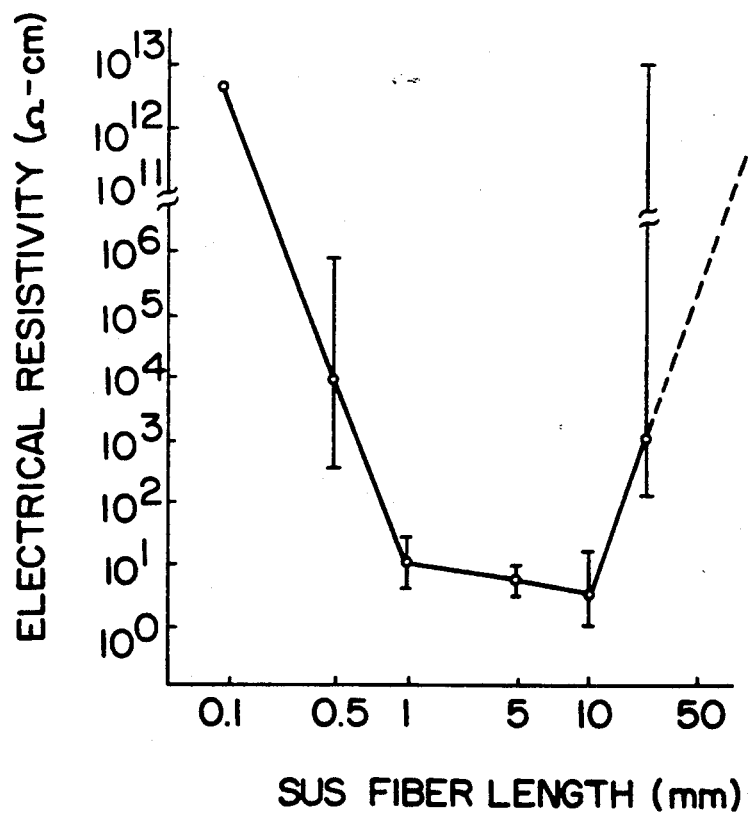

ELECTRO-CONDUCTIVE RESIN COMPOSITION

BACKGROUND OF THE INVENTION

The present invention relates to an electro-conductive resin composition, particularly to a resin composition used as a material for shielding electro-magnetic or electrostatic field or an antistatic or static dissipative material.

Hitherto, there have been used electro-conductive resins, in which one for shielding electro-magnetic or electrostatic field has a resistivity of about $10^0$–$10^2$ $\Omega$-cm or less and the other for static dissipative materials has a resistivity of about $10^4$–$10^{11}$ $\Omega$-cm. The electro-conductive composition material generally comprises a matrix resin blended with electro-conductive materials or fillers, which are mainly selected from the group comprising metal fibers such as stainless steel fibers, cooper fibers, aluminum fibers, brass fibers, nickel fibers and etc.. For instance, there is disclosed an electro-conductive resin containing metal fibers in U.S. Pat. No. 4,664,971.

On the other hand, the inventors has already proposed a new electro-conductive resin composition blended with zinc oxide whiskers in a tetrapod shape.

However, there are the following problems to be solved in the conventional resin composition blended with the metal fibers, such as stainless steel fibers.

Firstly, it is difficult to provide an article, if made of the above resin composition, with a stable electro-conductivity, because the metal fibers are hard to be uniformly dispersed in a resin matrix and thus to be fully distributed at a corner or narrow portion and also the mutual contact probability of the metal fibers comes to be small as the result of their orientation along the resin flow on molding.

Secondly, the electro-conductivity tends to be decreased owing to a cycle of cooling and heating, because the total number of mutual contact points is small and also there is a large volume difference between expanding and shrinking owing to the above cycle.

Thirdly, there are some problems of the article surface characteristics and coloring appearance.

On the other hand, when a resin composition comprises carbon fibers or powders, the color tone is limited to black and there are some problems from the view point of inflammability or burning resistance, as well as a problem of stable electro-conductivity.

Furthermore, there has been a high specific gravity and loading problem in an electro-conductive resin containing zinc oxide whiskers in a tetrapod shape.

SUMMARY OF THE INVENTION

Therefore, it is an object of the present invention to solve the above problems as a result of various detailed studies by use of the following resin composition.

The resin composition comprises a matrix resin blended with metal fibers having a length of 0.5–10 mm and tetrapod shaped whiskers of zinc oxide (hereinafter referred to as ZnO) having a length of 3–200 $\mu$m from base to tip of needle crystal structure. More specifically, the resin composition may be comprised of resin 100 weight parts blended with metal fiber 0.5–15 weight parts and ZnO tetrapod whisker 1–200 weight parts.

Firstly, it is possible according to the invention to increase the number of mutual contact points to provide the resin composition with a stable electro-conductivity. The reason is as follows:

In the invention, there are used long fibers (0.5–10 mm) together with short fibers (3–200 $\mu$m) and it is characterized in that the short fibers are in a three-dimensional tetrapod shape. Therefore, long fibers are easy to orient along a resin flow upon molding while the short fibers are difficultly influenced by resin flow and also are in the tetrapod shape, so that they are dispersed in all directions and are not oriented in one direction. The three-dimensional tetrapod shaped ZnO whiskers tend to coil around the long fibers and carry the long fibers at a corner and thus provide a resin composition with a stable electro-conductivity, that is, keep a lot of the mutual contact points between the fibers in the resin composition.

Secondly, it is possible according to the invention to cause the deteriorating effect of the electro-conductivity owing to a heating-cooling cycle to be small. Because it is considered that the function may be caused by that, as discussed above, there exist a lot of the mutual contact points in the resin composition and also expanding-shrinking action of the resin composition owing to the heating-cooling cycle is made to be small in all directions.

Thirdly, it is possible according to the invention to provide the resulting article with good surface characteristics having no rough parts owing to low shrinking and uniform distribution characteristics.

Fourthly, it is possible according to the invention to provide the resulting article with good coloring and burning resistance or flame proof characteristics because the tetrapod shaped ZnO whisker is a white and electro-conductive ceramic material.

BRIEF DESCRIPTION OF THE DRAWINGS

The invention will now be further described by means of the following embodiments and with reference to the accompanying drawings. However, it is to be noted that the invention should be not construed to be limited to the embodiments.

FIG. 1 is an electron photomicrograph of ZnO whisker used to the inventive resin composition showing a crystal structure thereof.

FIG. 2 is a graphic representation of the relationship between the heat cycle number and the change rate of electrical resistivity of the inventive resin compositions B, C and the conventional resin composition A.

FIG. 3 is a graphic representation of the relationship between the length of SUS fiber and the electrical resistivity of the inventive resin composition.

DETAILED DESCRIPTION OF THE INVENTION

Example

The ZnO whiskers to be used in the invention are in a tetrapod shape as shown in an electron photomicrograph of FIG. 1. The whiskers may be prepared by subjecting zinc metal powder having an oxide coating at the surface to a heat treatment under an atmosphere containing oxygen gas. The whiskers thus produced have an apparent bulk specific gravity of 0.02–0.1 and are rich in productivity with the high yield of 70% or more.

As apparent from X-ray diffraction diagram of the ZnO whisker, all peaks are ZnO ones while an electron ray diffraction diagram shows the fact that the ZnO whisker has a single crystal characteristic having a little transition and lattice defects. Furthermore, the atomic-absorption spectroscopy test shows the fact that the ZnO whisker comprises ZnO of 99.8% and the impurity content is very small.

Meanwhile, the ZnO whiskers mainly comprises 4 axial ones and may be intermixed with 3 axial or 2 axial and 1 axial ones, which are partly-broken 4 axial whiskers. There may be found a ZnO whiskers intermixed with plate-like ones.

As to the size of ZnO whiskers, one having a length of 3-200 μm from the base to the tip thereof is preferable. If it is smaller than 3 μm, no tetrapod structure effect and only the same effect as that of the conventional powder is observed. On the other hand, if it is larger than 200 μm, the tetrapod structure is easily broken on blending and thus ratio of simple needle ones to 4 axial ones is increased. Such a phenomenon is not preferable to mass-production of the larger sized whiskers. From the viewpoint of the tetrapod structure, ZnO whiskers having a length of 5-100 μm, preferably 10-50 μm, from the base to the tip of needle crystal, are suitable to be used in the invention.

From the viewpoint of the resistance value, ZnO whisker having a scope of $10^2$-$10^{11}$ Ω-cm, preferably $10^6$-$10^{10}$ Ω-cm, more preferably $10^7$-$10^9$ Ωcm is suitable to be used in the invention. The measuring method of the ZnO whisker used in the invention is as follows:

ZnO whisker sample of 0.5 g is uniformly inserted between a pair of 20 μmφ plate electrodes and subjected to a uniform pressure of 5 kg/cm$^2$. Then, a resistance between a pair of the plate electrodes is measured by a super insulating resistor (High Resistance Meter 4329A made by HP corporation) to read a measuring voltage of 25V. On the other hand, the thickness of a ZnO whisker pressed sample is measured by a slide gauge and the volume resistance value P is calculated by using the thickness, sample area (3.14 cm$^2$) and the resistance value measured as above. The equation to be used in the calculation is as follows:

$$P[\Omega\text{-cm}] = R \cdot S/t$$

wherein R[Ω]:resistance value, S[cm$^2$]:sample area, t[cm]:sample thickness, measuring condition: 20° C., 40% RH.

The metal fiber used in the invention may be selected from the group comprising metal fibers made of stainless steel, copper, brass, aluminum, silver, nickel, palladium, iron, gold and etc.; stainless steel and copper fibers are preferred from a practical standpoint. A preferred length of the metal fiber is from 0.5 to 10 mm. If the length is below 0.5 mm, the effect of providing an electro-conductivity is largely decreased. On the other hand, if the length is beyond 10 mm, the mutual coiling ratio between metal fibers becomes large, so that the metal fibers are hard to be distributed uniformly in the resin matrix. Among them, 1 to 10 mm long ones, especially 4 to 6 mm long ones are preferred to be used in the invention from the viewpoint of distribution and electro-conductivity.

According to an aspect of the invention, an electro-conductive resin composition for electro-magnetic shielding and electro-static shielding having a low resistance of about $10^0$-$10^2$ Ω-cm or less may be prepared by blending resin 100 weight parts with metal fiber 3 to 15 weight parts and tetrapod shaped ZnO whisker 1 to 200 weight parts. It is not preferable to blend the metal fiber of beyond 15 weight parts, because no remarkable improvement on electro-conductivity is gained in proportion to metal fiber content although the cost becomes high. On the other hand, it is also not preferable to blend the ZnO whiskers of beyond 200 weight parts because of causing the mechanical characteristic of resin to be lowered and the specific gravity to be high. Taking the above consideration into account, ZnO is preferably blended in an amount of 5 to 100 weight parts, particularly in an amount of 8 to 70 weight parts.

Furthermore, according to another aspect of the invention, an electro-conductive resin composition for static dissipative material having a high resistance of about $10^4$-$10^{11}$ Ω-cm or less may be prepared by blending resin 100 weight parts with metal fibers 0.5 to 3 weight parts and tetrapod shaped ZnO whiskers 1 to 200 weight parts. It is not preferable to blend the metal fiber of below 0.5 weight parts and ZnO whisker of below 1 weight parts, because the blended resin composition becomes an insulant. From the viewpoint of static dissipative effects, it is preferable to blend the metal fiber of 2 to 3 weight parts and the tetrapod shaped ZnO whisker of 8 to 100 weight parts therewith.

The resin composition according to the invention may contain any other electro-conductive fillers with the above fibers and whiskers in order to improve further electro-conductivity. The filler may be selected from the group comprising granular, fiber-like, flaky carbon or metals such as gold, silver, alminium, brass, nickel and etc. The content thereof is 10 to 100 weight parts to be added in each materials. The resin used in the invention comprises all the resin materials which compose the inventive resin composition and may comprises both thermosetting and thermoplastic resins.

The thermosetting resin may be selected from the group compressive epoxy resin, unsaturated polyester resin, urethane resin, silicon resin, melamine-urea resin, phenol resin and etc.

The thermoplastic resin may be selected from the group comprising polyvinylchloride, polypropylene, polyethylene, polystyrene, chlorinated polyethylene, polyethylene terephthalate, polybutyleneterephthalate, polyamide, polysulfone, polyetherimide, polyethersulfone, polyphenylenesulfide, polyetherketone, polyether etherketone, modified PPE resin, modified PPO resin, ABS resin, polybutadiene, methyl methacrylate, polyacrylonitrile, polyacetal, polycarbonate, ethylene-vinyl chloride copolymer, poly vinyl acetate, ethylenetetrafluoroethylene copolymer, aromatic polyester, polyvinylfluoride, polyvinyllidenefluoride, polyvinylidene chloride, teflon and any other monopolymers and also any other copolymers. Among them, ABS resin, polystyrene, polycarbonate, polyamide, polybutylene terephthalate, polyethylene terephthalate, modified PPE resin are preferable.

EXAMPLE 1

Tetrapod shaped ZnO whiskers are prepared, which have a length of 5 to 30 μm from the base to the tip and which base diameters are with in a scope of 0.3 to 3 μm. Stainless steel fibers (hereinafter referred to as "SUS") are prepared, which characteristics are as follows:
Brand: NASLON SIZING CHOP, made by NIPPON SEISEN Co. Ltd.
Material: SUS-304
Size: 8 μmφ×5 mm
Convergence number: 5000 pieces Bonding agent: PET type resin (attached amount of 12.2%)

ABS resin (STYLUCK, made by ASAHIKASEI Co. Ltd.) of 100 weight parts (hereinafter referred as "parts") and ZnO whisker of a predetermined amount were blended in a V type rotary mixer for 4 minutes and the mixture was subjected to a mixing (resin temp.:230° C.) and extruding treatment by means of a dual different direction extruder to give pellets thereof. Then, SUS fiber of a predetermined amount was measured and mixed very uniformly with the pellets, which mixture was molded in an injection molding equipment to give rectangular test pieces of 100 mm square and 3 mm thickness, wherein the cylinder temperature is 230° C. and injection pressure is 75 kg/cm² (gauge pressure). Both surfaces of the test piece were ground to each 2 mm thick degree by a sand paper of No.400 and subjected to a test. A resistivity measurement was done according to ASTM-D 257 under a measuring voltage of 500 V.

The electromagnetic shielding effect was determined according to ADVAN TEST method (measuring equipment: Model 4172 made by ADVAN TEST Co. Ltd.; measuring frequency: 10 to 500 MHz) and was evaluated by using peak values of electric field shielding. The test result is shown in Table 1. Criteria for judgement of electromagnetic shielding effect is given as follows:

○: good (60 dB or more);
Δ: somewhat bad (30 to 60 dB)
E: with static field shielding (30 dB or less)

As shown in EXAMPLE 1, it is found that there are obtained two type compositions: one good for electromagnetic shielding and the other good for static field shielding.

It is also found that there exists a composition having a good appearance having few rough parts at the surface of resin test piece. Such a surface improvement was obtained by adding ZnO whisker of 1 part or more into a resin matrix.

EXAMPLE 2

The test was carried out according to the same procedure as the above EXAMPLE 1 with use of copper fibers having a size of 8 μmϕ×5 mm and the result is shown in TABLE 2.

EXAMPLE 3

Resin plates selected from ones prepared in EXAMPLE 1 and 2 were subjected to a heat cycle treatment from −60° C. to 90° C. and the result is shown in FIG. 2, which shows that blending of ZnO whiskers give a remarkable improvement on a heat cycle resistance to a resin composition thereof and SUS fibers are more preferable than copper fiber in the viewpoint of improvement of the heat cycle resistance.

EXAMPLE 4

Resistivity change ratio depending on the length of SUS fiber was evaluated according to the same criteria as EXAMPLE 1 and the result is shown in FIG. 3.

Almost the same tendency of the result was found by use of copper fiber.

EXAMPLE 5

Resistivity change ratio depending on the length of ZnO whisker was evaluated according to the same criteria as EXAMPLE 1 and the result is shown in Table 3.

The composition comprises ABS resin (100 parts), SUS fiber (0.5 parts) and ZnO whisker (10 parts).

TABLE 3

| Length from the base to the tip (μm) | Resistivity (Ω-cm) |
| --- | --- |
| 200 to 250 μm | $8 \times 10^{11}$ |
| 3 to 200 μm | $1 \times 10^{7}$ |
| 1 to 3 μm | $6 \times 10^{13}$ |

(SUS fiber: 8 μmϕ × 5 mm)

Almost same tendency was found in use of copper fiber.

As explained as above, according to the invention there are now provided resin materials having electrical characteristics, productivity and surface appearance characteristics after molding and etc. which have been incompatible in the conventional materials, in order to be fully responsive to the demand for EMI and ESD accompanied with the developments of electronic devices.

TABLE 1

| | | | | ( ) wt. parts | | |
| --- | --- | --- | --- | --- | --- | --- |
| | Resin | Cu fiber | Zuo whisker | Electrical Resistivity Ω-cm | Electro-Magnetic Shielding | Surface Appearance |
| Ex. | ABC (100) | (4) | (200) | $2 \times 10^{0}$ | ○ | ○ |
| | | (15) | (60) | $0.8 \times 10^{0}$ | ○ | ○ |
| | | (0.5) | (60) | $5 \times 10^{6}$ | E | ○ |
| | | (4) | (1) | $8 \times 10^{0}$ | ○ | ○ |
| | | (4) | (60) | $4 \times 10^{0}$ | ○ | ○ |
| | | (15) | (200) | $0.6 \times 10^{0}$ | ○ | ○ |
| | | (4) | (100) | $3.5 \times 10^{0}$ | ○ | ○ |
| | | (15) | (120) | $0.7 \times 10^{0}$ | ○ | ○ |
| | | (0.5) | (5) | $1.8 \times 10^{7}$ | E | ○ |
| | | (0.5) | (20) | $8 \times 10^{6}$ | E | ○ |
| | | (4) | (40) | $5 \times 10^{0}$ | ○ | ○ |
| comparative | ABC (100) | (4) | — | $2 \times 10^{2}$ | Δ | X |
| | | (0.3) | (60) | $3 \times 10^{13}$ | — | — |
| | | (4) | (0.5) | $1 \times 10^{2}$ | Δ | X |

○ ... good
Δ ... somewhat bad
X ... bad

TABLE 2

| | | | | ( ) wt. parts | | |
| --- | --- | --- | --- | --- | --- | --- |
| | Resin | Cu fiber | Zuo whisker | Electrical Resistivity Ω-cm | Electro-Magnetic Shielding | Surface Appearance |
| Ex. | ABC (100) | (4) | (200) | $0.8 \times 10^{0}$ | ○ | ○ |
| | | (15) | (60) | $0.3 \times 10^{0}$ | ○ | ○ |
| | | (0.5) | (60) | $2 \times 10^{6}$ | E | ○ |
| | | (4) | (1) | $2 \times 10^{0}$ | ○ | ○ |
| | | (4) | (60) | $1 \times 10^{0}$ | ○ | ○ |
| | | (15) | (200) | $0.3 \times 10^{0}$ | ○ | ○ |
| | | (4) | (100) | $1 \times 10^{0}$ | ○ | ○ |
| | | (15) | (120) | $0.4 \times 10^{0}$ | ○ | ○ |
| | | (0.5) | (5) | $1 \times 10^{7}$ | E | ○ |
| | | (0.5) | (20) | $2 \times 10^{6}$ | E | ○ |
| | | (4) | (40) | $2 \times 10^{0}$ | ○ | ○ |
| comparative | ABC (100) | (4) | — | $8 \times 10^{2}$ | Δ | X |
| | | (0.3) | (60) | $8 \times 10^{12}$ | — | — |
| | | (4) | (0.5) | $7 \times 10^{2}$ | Δ | X |

○ ... good
Δ ... somewhat bad
X ... bad

What is claimed:

1. An electroconductive resin composition, which comprises a matrix resin at 100 weight parts, blended with metal fibers at 0.5 to 15 weight parts having a length of 0.5 to 10 mm and zinc oxide whiskers having a tetrapod needle crystal structure at 1 to 200 weight parts, having a length of 3 to 200 μm from the base to the tip of the needle crystal structure.

2. Electroconductive resin composition according to claim 1, wherein the zinc oxide whiskers in a tetrapod shape have a length of 5 to 100 μm from the base to the tip of needle crystal structure.

3. Electroconductive resin composition according to claim 2, wherein the zinc oxide whiskers in a tetrapod shape have a length of 10 to 50 μm from the base to the tip of needle crystal structure.

4. Electroconductive resin composition according to claim 1, wherein the metal fibers have a length of 1 to 10 mm.

5. Electroconductive resin composition according to claim 4, wherein the metal fibers have a length of 4 to 6 mm.

6. Electroconductive resin composition according to claim 1, wherein the content of the tetrapod shaped zinc oxide whisker is 5 to 100 weight parts.

7. Electroconductive resin composition according to claim 6, wherein the content of the tetrapod shaped zinc oxide whisker is 8 to 70 weight parts.

8. Electroconductive resin composition according to claim 1, wherein the content of the metal fiber is 0.5 to 3 weight parts.

9. Electroconductive resin composition according to claim 1, wherein the content of the metal fiber is 3 to 15 weight parts.

10. Electroconductive resin composition according to claim 1, wherein the metal fiber is a stainless steel one.

11. Electroconductive resin composition according to claim 1, wherein the metal fiber is a copper one.

12. Electroconductive resin composition according to claim 1, wherein the resistance value of the tetrapod shaped zinc oxide whisker is $10^2$ to $10^{11}$ Ω-cm.

13. Electroconductive resin composition according to claim 12, wherein the resistance value of the tetrapod shaped zinc oxide whisker is $10^6$ to $10^{10}$ Ω-cm.

14. Electroconductive resin composition according to claim 13, wherein the resistance value of the tetrapod shaped zinc oxide whisker is $10^7$ to $10^9$ Ω-cm.

* * * * *